United States Patent [19]
Maynard

[11] 3,716,771
[45] Feb. 13, 1973

[54] DC MOTOR SPEED CONTROL WITH MOTOR VOLTAGE AND CURRENT SENSING MEANS

[75] Inventor: John T. Maynard, New Berlin, Wis.
[73] Assignee: A. O. Smith Corporation, Milwaukee, Wis.
[22] Filed: March 1, 1971
[21] Appl. No.: 122,636

Related U.S. Application Data

[63] Continuation of Ser. No. 713,247, March 14, 1968, abandoned.

[52] U.S. Cl. ................................................. 318/331
[51] Int. Cl. ............................................... H02p 5/16
[58] Field of Search ............... 318/331, 332, 345, 338

[56] References Cited

UNITED STATES PATENTS

| | | | |
|---|---|---|---|
| 3,181,050 | 4/1965 | Berman | 318/331 |
| 3,599,064 | 8/1971 | Friedman | 318/331 |
| 3,284,688 | 11/1966 | Black | 318/332 |
| 3,435,316 | 3/1969 | Wilkerson | 318/338 |
| 3,518,519 | 6/1970 | Callan | 318/332 |

Primary Examiner—Bernard A. Gilheany
Assistant Examiner—Thomas Langer
Attorney—Andrus, Sceales, Starke & Sawall

[57] ABSTRACT

This disclosure is directed to a feedback control for a D.C. shunt motor for motoring and regenerating modes of operation. The motor armature is connected to a three-phase A.C. input by a pair of full wave bridge networks connected in parallel and having silicon controlled rectifiers in each leg.

Input and feedback signals are summated to an error signal which is then summated with a cemf signal to establish a control signal connected to actuate a gating regulating means which in turn controls firing of the controlled rectifiers of the two bridges with a zero current firing angle control.

The gating regulator connected to the rectifier is a "nor" logic current for each unit and includes a zero current detector in combination with an intercept detector which provides an output during the proper half cycle of the applied voltage and further transmits a signal in accordance with the desired phase angle for firing of the controlled rectifier.

16 Claims, 5 Drawing Figures

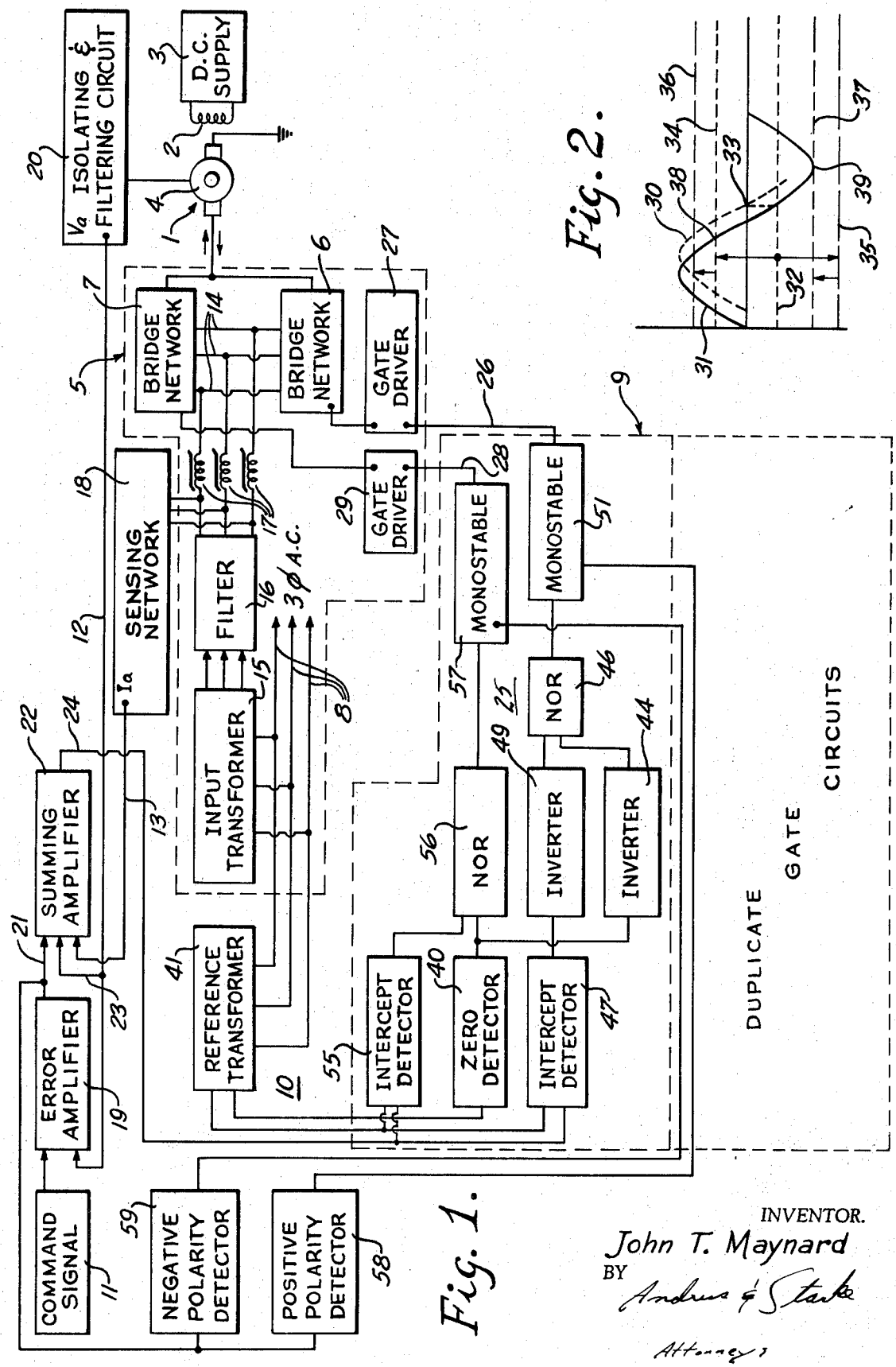

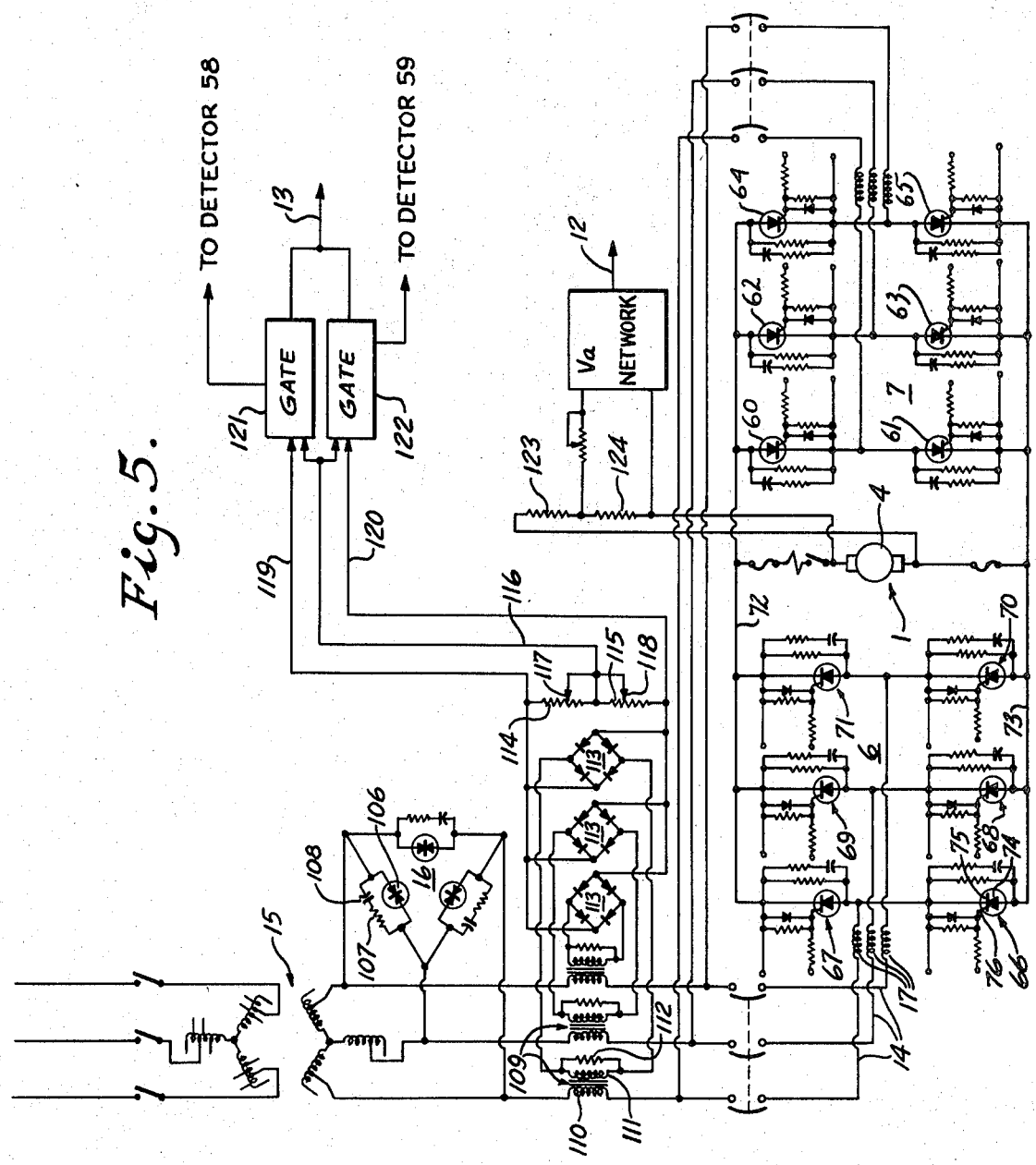

DC MOTOR SPEED CONTROL WITH MOTOR VOLTAGE AND CURRENT SENSING MEANS

This application is a continuation application of application Ser. No. 713,247 filed on Mar. 14, 1968 and entitled "DYNAMOELECTRIC CONTROL CIRCUIT", now abandoned.

This invention relates to a dynamoelectric control circuit and particularly to a control circuit for regulating the armature voltage of a direct current motor while supplying the required demand current for motoring or regenerating loads.

Direct current motors and the like are employed in control and drive systems and generally include some form of a feedback system to control the input power to the motor and thereby the motor speed or output. A direct current shunt motor is highly desirable where a relatively constant speed is desired with a high starting torque; for example, where fairly heavy loads are encountered. The shunt motor may conveniently have fixed field excitation and an armature current control providing the desired speed and torque control.

The torque or speed of a shunt motor can be controlled by changing the voltage applied to the field, the voltage applied to the armature or both. The voltage supplied to the armature may be conveniently controlled with the recently developed solid state devices such as silicon controlled rectifiers of either the unilateral or bilateral conduction variety both of which allow effective varying of the connection of a polyphase voltage supply to the armature.

One of the severe problems encountered in motor controls however is the provision of a truly linear control and one which permits operation of the motor automatically in either a motoring mode or a regenerating mode. Thus, a direct current motor when being driven by a load functions as a generator and it is highly desirable to permit regenerating operation of the motor whereby the electrical power generated is fed back into the supply lines.

With the development of the silicon controlled rectifier and other gated electronic solid state switches, a great plurality of motor control circuits have been suggested to selectively control the power supply connection of an electrical load including the armature winding of shunt motors and the like. However, applicant knows of no control circuit which provides a highly linear control and which can be applied to a wide range of motor sizes.

The present invention is particularly directed to a highly linear control for a direct current load and particularly a direct current shunt motor for maintaining the motor output torque and speed within exceptionally close tolerances and generally of the order of one-half, one or two per cent, if necessary.

Generally, in accordance with the present invention, an analog control system is provided, providing an analog input signal and an analog feedback signal. The input and feedback signals are summated to provide a summated error signal which is then summated with a signal in accordance with the counter-electromotive force (cemf or counter emf) of the direct current dynamoelectric load to control the application of power to the armature. The summated control signal is interconnected to actuate a gating regulating means which in turn is interconnected to control phased firing of a solid state gated network interconnecting the motor to an alternating current source. By proper firing of the gated network, the necessary power is supplied to the motor to maintain predetermined operating conditions.

The summated counter-electromotive force signal and error signal establishes a novel zero current firing angle control to effectively connect the power supply to the armature at the proper time. Thus, the cemf signal establishes an effective zero crossover or gating point for zero armature current and continuously adjusts the reference level from which the error signal causes the application of voltage to the armature and thus provides variation in the input in accordance with both the cemf and the actual error signals.

The gating regulating means is arranged such that in the absence of any counter-electromotive force, the firing is established at the zero crossover point of the applied voltage. The zero crossover point is that point in time when the applied anode voltage goes from positive to negative for the particular silicon controlled rectified. In order to obtain load current, the firing of the rectifiers is advanced from the zero current crossing point to fire during the positive half cycle. The true or effective zero current crossing point varies with line voltage and counter emf and the device is advanced with respect to such effective point only when there is an error signal and further in accordance with the magnitude of such error signal.

In order to provide reversible motor operation, as well as regenerative operation, a gated network includes a pair of full wave bridge networks connected in parallel to the armature and employing triggered switch means such as silicon controlled rectifiers or any other similarly functioning means interconnected to the motor to selectively conduct armature currents in either direction and thereby establish corresponding opposite torques. The dual gated networks permit operating of the motor in either direction with either a motoring or a regenerative mode of operation. The circuit automatically senses the mode on the basis of an error signal and selects the proper network to establish the related armature current. Each of the bridge networks is generally interconnected in a similar manner to the gated regulator means. A polarity sensitive circuit senses the summated error signal derived from the command signal and the feedback signal to determine which of the two networks operate.

Generally, in accordance with the present invention, the gating regulating means is a digital signal generator having a logic circuit for each of the gated devices of the bridge networks. The logic circuit includes a zero current detector in combination with an intercept detector interconnected into a "Nor" type logic unit which provides an output during the proper half cycle of the applied voltage and further transmits a signal in accordance with the desired phase angle. The zero current and intercept detectors provide logic signals which limit the effective firing of the rectifiers to an operative period which corresponds to the period the anode of the rectifier is positive. The intercept detector is connected to the summated control signal and provides a logic signal to determine precisely within such operative period when the rectifiers are fired. The output of the logic circuit fires a pulse forming circuit such as a monostable or rapid trigger circuit which in turn is preferably connected through a gate driving circuit to the proper gated rectifier or devices.

Further, applicant has found that in order to obtain a highly accurate linear control, an A.C. reference voltage related to that applied to the rectifiers and connected to the intercept detector should be shifted to lead the voltage applied to the rectifiers by thirty degrees. In order to provide proper synchronized firing, the intercept detector includes an internal direct current bias circuit to compensate for the phase displacement and effectively return the firing to the original zero crossover point of the main applied voltage. This has been found to provide a highly linear response characteristic; i.e. the characteristic between the command signal and the power supplied to the motor is essentially a straight line in the continuous current conduction mode. This is very important in order to maintain stability and proper operation in the high current region of the motor circuit or the like and further to permit full output in the presence of the counter-electromotive force.

Further, in accordance with the circuit, applicant has found that the counter emf component which is fed back into the control system should be modified for optimum functioning such that the armature current is essentially directly proportional to the error signal and independent of the absolute value or amplitude of the counter emf. Applicant has found that this modification can be controlled by providing a proper selection and modification of the primary and secondary voltages of the input transformer and proper proportion of $I_A R_A$ feedback.

The present invention provides a highly reliable solid state control particularly adapted to control a shunt motor within close tolerances and having a linear and sensitive response.

The drawings furnished herewith illustrate a preferred construction of the present invention in which the above advantages and features are clearly disclosed as well as others which will be clear from the following description.

In the drawings:

FIG. 1 is a block diagram of a motor control circuit constructed in accordance with the present invention;

FIG. 2 is a graphical illustration showing the gating characteristics for a gated bridge network;

FIG. 5 is a schematic circuit illustrating a preferred rectifier bridge and input power supply circuit.

Figure 3:
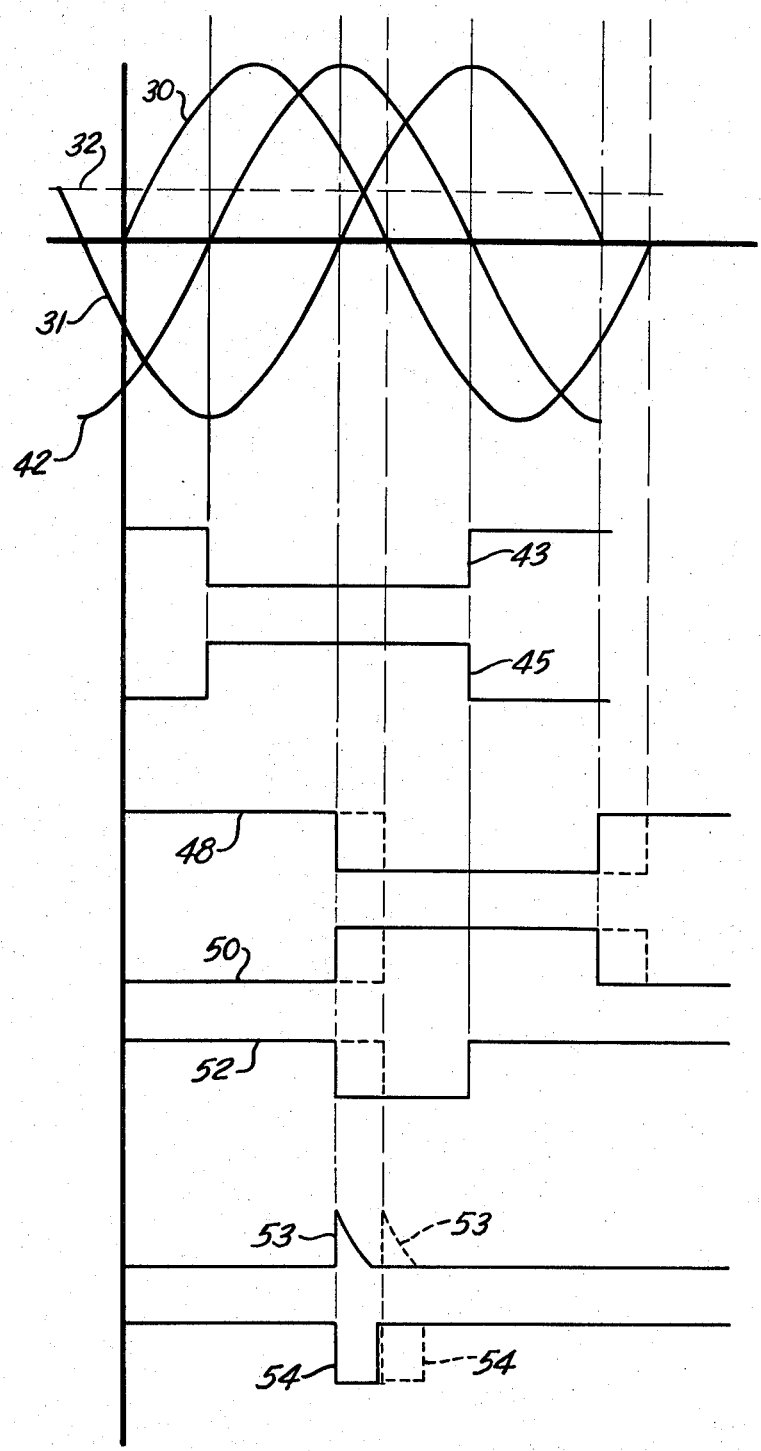
FIG. 3 is a graphical illustration of the voltage signals at certain points in the circuit shown in FIG. 1.

Referring to the drawings and particularly to FIG. 1, the present invention is illustrated applied to control the speed of a direct current shunt motor 1 of any well known construction. The illustrated shunt motor is diagrammatically shown including a field 2 connected to a fixed excitation source 3. An armature 4 is rotatably mounted within the field 2 and is connected to a direct current power supply circuit 5 which includes a pair of gated rectifier bridge networks 6 and 7 to selectively provide forward and reverse current to the armature 4. The input sides of the bridge networks 6 and 7 are connected in parallel to three phase power source lines 8 which may, for example, be the widely employed industrial 440 volt alternating current. As more fully developed hereinafter, the bridge networks 6 and 7 include gated devices such as silicon controlled rectifiers or the like to vary the applied voltage and the magnitude of the corresponding armature current. Bridge network 6 establishes a given directional flow with the resulting torque providing a motoring action in one direction, or, if the motor is overdriven and functioning as a generator, a braking or regenerating action. Bridge network 7 establishes the opposite directional current with a corresponding motoring or regenerating action. A digital gating regulator 9, forming a part of a control or regulating circuit 10, is interconnected to the bridge networks 6 and 7 to selectively control the firing and conductivity thereof. A command signal unit 11 provides a direct current input voltage proportional to the desired energization of the motor 1. The output of unit 11 is interconnected in a unique manner to a voltage feedback signal line 12 and a current feedback signal line 13 to control the gating regulator 9 and thereby the armature current.

More particularly in FIG. 1, three phase bridge input lines 14 are parallel connected to the bridge networks 6 and 7 which, as shown in FIG. 5, may be the standard three phase full wave gated bridge circuits employing silicon controlled rectifiers or other gated devices. The three phase input lines 14 are connected to the power supply lines 8 through an input transformer 15 preferably of a wye to wye variety.

A commutation and oscillation filter network 16 is interconnected to the output side of the transformer 15 to protect the bridge circuits during commutation from one branch to another and to protect against voltage transients which may be introduced into the system as a result of switching circuits and the like.

Inductors 17 are connected one in each of the phase lines between the network 16 and the input lines 14. A current sensing network 18 is also connected to the lines from network 16 and may include isolating and filter means such that the current feedback line 13 connected to network 18 provides a signal proportional to the total armature current.

Line voltage is thus simultaneously applied across both of the bridge networks 6 and 7, only one of which is conditioned to conduct as a result of obtaining a proper signal from the digital gating regulator 9 depending upon the desired rotation or torque of the motor 1, as subsequently described.

The control circuit 10 includes an error amplifier 19 which in the illustrated embodiment may be any suitable negative gain operational amplifying circuit having a pair of inputs one of which is connected to the command signal unit 11 and the other of which is connected to the voltage feedback line 12. The error amplifier 19 is selected to have a substantial gain or beta; a beta of the order of 68 has been found satisfactory in one practical circuit. The output of the error amplifier 19 is proportional to the difference in the command signal and the voltage feedback signal multiplied by the gain of the error amplifier 19.

A voltage isolating and filtering circuit 20 is connected to the circuit of the armature 4 of the motor 1 to provide an isolated D.C. signal proportional to the armature voltage. This signal is passed through circuit 20 to eliminate the ripple component inherent in the output of the armature and to provide an essentially pure D.C. signal at the feedback line 12. The feedback signal is also scaled by the circuit 20 in accordance with the command signal range. Thus, for example, the voltage applied to the D.C. motor may be of the order of 500 volts D.C. whereas the command signal may be in the order of plus or minus 10 volts D.C. Consequently, the armature voltage must be scaled down to give a corresponding related signal.

The amplified output signal of the error amplifier is connected via an output line 21 to the input of a multiple input summing amplifier 22.

The summing amplifier is a suitable operational amplifier adapted to algebraically summate a plurality of D.C. signals and may have a beta of 1. A second input of the summing amplifier 22 is connected to the current feedback line 13 and a third input is connected by a line 23 to the voltage feedback line 12.

As the resistance of the armature is fixed, or constant, the current feedback signal at line 13 provides a signal proportional to the armature losses which is, of course, equal to the armature current times the armature resistance. Consequently, the difference between the voltage proportional signal at line 12 and the current proportional signal at line 13 is proportional to the counter-electromotive force of the armature. The output of the summing amplifier 22 appearing at line 24 is therefore equal to the summated error signal and counter-electromotive force signal and may be conveniently written ($\pm$Vg $\pm$ B$\Delta$V). The control signal line 24 is interconnected to the digital gating regulator 9 to apply this summated signal to the regulator and control the firing of the bridge networks 6 and 7.

The digital gating regulator 9 is specially constructed in accordance with the present invention to provide a zero current firing or tracking system and generally includes six similar gate boards or circuits 25 each of which is similarly constructed to provide a pair of output signals. As each of the gate boards 25 is similarly constructed, only one is shown with detailed block diagram in FIG. 1. The output of circuit 25 includes a forward bridge gate line 26 interconnected to a gate driver 27 for controlling selected gated rectifier elements of the bridge network 6 and a second or reverse bridge gate line 28 is similarly interconnected to a gate driver 29 for the network 7.

Before describing the detail of the gate board 25, the theory of the triggering control is further described in connection with the graphical illustration in FIG. 2 wherein the Y-axis is a voltage scale and the X-axis is a time scale.

An alternating current sine wave voltage curve 30 is illustrative of the anode voltage applied to the silicon controlled rectifiers or similar gates devices in each of the networks 6 and 7.

A trigger reference A.C. voltage curve or trace 31 which is applied to the gating regulator 9 is shown on a corresponding time scale. The reference voltage is employed to control firing of networks 6 and 7 and thereby the flow of current in the armature 4. The trigger reference A.C. curve 31 is displaced 30° (after filtering) with respect to the voltage curve 30 applied to the bridge network to provide improved linearity of control. A direct current fixed bias forming a part of regulator 9 in the illustrated embodiment and particularly board 25 is superimposed on the reference voltage as shown by line 32.

It is noted that the fixed D.C. bias is selected to establish intercept of the reference voltage curve 31 with the fixed bias level line 32 in synchronism with the zero crossover point 33 of the bridge voltage curve 30. In the absence of a counter emf and/or an error signal, this is the proper point at which to fire the related gated portion of networks 6 and 7 for zero current. To obtain load current, the gate firing must be advanced ahead of the zero current firing point. Further, the true zero current point, which is when the anode voltage changes from positive to negative relative to the cathode voltage varies with the counter emf and line voltage. To provide proper and continuous tracking of the effect, a direct current signal of an appropriate polarity is provided as shown by a positive counter-electromotive force line 34 and a corresponding negative counter-electromotive force line 35. The signal 34 or 35 adds to the D.C. fixed bias voltage and the intersection with the curve 31 establishes the true zero current firing point.

Referring to FIG. 2, the thirty degree offset of the filtered reference signal curve 31 establishes its maximum peak in phase with the sixty degree angle of the positive half cycle of the anode voltage curve 30. In a full wave three phase system, the 60° point of any one phase voltage is the first point at which conduction can start because of the other phase voltages. The error signal which may also be positive or negative provides a further direct current bias in the circuit at any given time or instance. In FIG. 2, only a positive error signal is shown superimposed upon the positive counter emf to define motor intercept line 36 and upon the negative counter emf line to define regenerate intercept line 37. The gate signal is to be established whenever the curve 31 intercepts the D.C. level line 36 or 37.

For any given counter-electromotive force and error signal, the motoring intercept point 38 occurs during the positive half cycle and is phased back from the zero current intercept established by the counter emf signal line 34 in accordance with the magnitude of the error. For regenerative action, the regenerate intercept point 39 occurs during the relatively negative half cycle of the bridge voltage and properly biases the bridge network 6 and 7 to conduct the regenerative current and return the power to the supply lines. When the motor intercept line 36 or the regenerated intercept line 37 is at or above the peak of the reference curve 31, the gating regulator 9 establishes a fire or gate pulse at the peak of the reference signal and produces maximum output.

The digital gating regulator 9 provides the desired interaction in the illustrated embodiment of the invention as shown in block diagram in FIG. 1 where the six similar gate boards 25 are provided and one of which is shown with the several components identified by labeled blocks. The details of a preferred construction being shown in FIG. 4 and subsequently described. The board or circuit 25 is a digital logic circuit. The logic circuit may employ a binary notation system and is described with a negative voltage logic having a "0" voltage signal as "0" level and a negative "1" voltage signal as the "1" level in accordance with the circuit of FIG. 4. Further, the illustrated control circuit of FIG. 4 employs PNP type transistor elements and requires a reference signal input which is phase-shifted 180° with respect to signal curve 31. To maintain simplicity of subsequent description, FIG. 1 is further described with the above logic and the several output curves properly shown in FIG. 3, with the curves operatively corresponding to those of FIG. 2 similarly numbered.

The circuit 25 includes a zero detector circuit or module 40 which is connected to an anode voltage reference transformer 41. The zero detector reference voltage curve 42 is phase shifted by 60° lag with respect to the anode voltage curve 30 to limit the proper gate pulse firing range for maximum gate signal advance when motoring, and the maximum retard when regenerating. The output of the zero detector module 40 is a square wave signal 43 which in binary notation is at "1" level when the A.C. anode reference voltage curve 42 is positive and at a "0" level for the opposite 180° thereof. The output of the zero detector module 40 is applied to a logic inverter module 44, the output of which is an inverted square wave signal as shown at 45 in FIG. 3. The output of the inverter module is applied as one input of a two input "Nor" logic circuit module 46. In accordance with well known logic circuit connections, the "Nor" circuit 46 is such that the output will be at "0" signal in the presence of a "1" signal at either input and provide a "1" level or signal output only when there is a "0" signal applied to both inputs.

The second input of the "Nor" circuit 46 is interconnected to the summated control signal from the summing amplifier 22 through an intercept detector module 47.

The intercept detector module 47 is a further logic circuit having one input interconnected to the reference signal from the anode voltage reference transformer 41 and a second input connected to the signal line 24 to receive the summated signals of the counter emf signal and the error signal. The detector module 47 internally includes a D.C. bias control to provide the D.C. fixed bias shown by line 32 in FIGS. 2 and 3. The internal D.C. bias effectively vertically displaces the reference voltage curve 42 zero crossing such that the zero axis intercept is shifted 30° as shown by the new axis or direct current reference dashed line 32. The output of the intercept detector module 47 is a square wave signal 48 similar to that of the zero detector module but displaced therefrom by 120° when error signal and counter emf are zero and therefore from the anode reference voltage curve by the 180° previously noted. Further, because of the D.C. bias, the square wave is not symmetrical but is at a zero level for the period the reference wave is negative with respect to the zero reference line 32. The output of the detector module is fed to a logic inverter circuit or module 49 which provides a curve as shown at 50 in FIG. 3. The output of the inverter module 49 is applied as the second input to the two input "Nor" module 46, the output of which is interconnected to control a monostable circuit or logic module 51. The output of the "Nor" circuit is a square wave signal corresponding to the trace or curve 52 in FIG. 3. It is noted that the trace for the "Nor" circuit is at a "0" when the "1" is established by the output of zero detector module 40 and is maintained at the "0" level as a result of the "0" signal established by intercept detector module 47. When both inputs to the "Nor" module 46 are a "0" signal, the output of the "Nor" circuit becomes "1". The zero detector module 40 thus establishes a timing mark which effectively includes the last 120° of the anode reference curve positive half cycle and restricts firing control to the first 60° of the negative half cycle, producing a maximum control range of 180° (120° for motoring mode, and 60° for regenerative mode of operation).

An input into the monostable circuit 51 generates a timed pulse such as shown by curve 53 which in turn is applied to the gate driver 27 to generate a triggering pulse as shown by curve 54 in any suitable well-known manner. The output of the driver 27 is connected to fire network 6. In FIG. 3, pulse 53 occurs at the time the anode reference curve 31 passes through zero. This assumes there is no counter-electromotive force signal and/or error signal.

If the motor is operating at a speed corresponding to the command signal, a counter-electromotive force signal would be superimposed upon the D.C. bias and establish the line 34. This would advance the firing pulse and cause it to fire at the point in the applied anode voltage which equals the counter-electromotive force and produce the proper zero current angle. If, however, there is an error signal which is summated with the counter-electromotive force and establishes the D.C. line 36 to advance the firing angle from the zero current angle point and thus supply the necessary demand current.

If the error should cause the line 34 to exceed the peak value of the reference voltage of curve 31, a pulse 53 is established in synchronism with the peak which in turn corresponds to the 60° angle of the anode voltage curve 30. In a three phase system, this corresponds to maximum output capability and the regulator thus is continuous to provide maximum current until the error decreases to again produce an intercept with curve 31.

Simultaneously with the above generation of a transfer signal or of a pulse signal for gating a network 6, a corresponding signal is provided for network 7 from an intercept detector module 55 which has its output connected directly to a "Nor" circuit or logic module 56. The "Nor" logic module 56 has its second input connected directly to the output of the zero detector module 40 which forms a common control element for both of the bridge networks 6 and 7. The output of the "Nor" logic module 56 is similarly connected to a monostable circuit 57 which produces a corresponding train of pulse signals for the bridge network 7. These pulses will be phase shifted 180° with respect to the pulses 52 and 53 as a result of the elimination of the inverter modules 44 and 49 from the circuit channel relating to detector 55. Following the same reasoning as just given for network 6, it will be understood that network 7 responds to a negative error signal to amplifier 19 to conduct and establish an opposite torque.

Which of the two bridge networks 6 and 7 operates is determined by a pair of polarity detecting units 58 and 59 which are connected in parallel to the output of the error operational amplifier 19 and in particular to line 21. The positive error signal detector unit 58 has its output interconnected to the monostable circuits 51 for the bridge network 6 and the detector unit 59 is similarly connected to the monostable modules 57 for the bridge network 7. The detector units 58 and 59 are suitable polarity sensitive logic devices which will enable the proper circuit in response to the polarity of the error signal. Thus, a positive error signal will be sensed by the detector 58 to enable the bridge network 6 and simultaneously the negative detector unit 59 will disable the bridge network 7. Conversely if the error signal of amplifier 19 is negative, the network 6 will be disabled and network 7 enabled.

The operation of the circuit shown in FIG. 1 is briefly summarized as follows. As previously noted, network 6 always provides armature current in one direction and network 7 always in the opposite direction. The polarity of the error signal directly determines which network is to function for either motoring or regenerating action. Thus, if the command signal is positive which states positive voltage is to be applied to the armature to establish motoring in a given direction, the error signal is positive and bridge network 6 is properly fired as long as the command signal exceeds the armature voltage. Conversely, if the command signal is negative to establishing motoring in the opposite direction, the error signal is negative and bridge network 7 is properly fired as long as the command signal exceeds the armature voltage.

The dual networks 6 and 7 provide for reversible rotation of the motor with either the motoring mode or alternatively a regenerating mode of operation. The bridge network 6 is assumed to produce a current establishing a clockwise torque and bridge network 7 is assumed to produce a counterclockwise torque. In the operation of the illustrated circuit, if the motor is rotating in a clockwise direction, bridge network 6 is fired for the motoring mode of operation and the bridge network 7 for the regenerating mode. Conversely, if the motor is rotating counterclockwise, bridge network 7 is fired for the motoring mode of operation and bridge network 6 for the regenerating mode. Further, the polarity of the amplified error signal which is proportional to the command signal and the voltage error signal directly determines and properly fires one of the two networks 6 and 7 and during the proper half cycle of the alternating current input. For example, if the command signal is positive to command network 6 but the motor for some reason is overdriven in the motoring direction, the counter emf signal which is negative becomes greater than the command signal and reverses the polarity of the error signal. This changes the firing from the network 6 to network 7. Further, the signal is added to the corresponding D.C. bias and places the intercept on the positive half cycle of the network 7 for regenerative action. If the load should actually reverse the direction of rotation, the counter emf signal reverses and is added to the D.C. bias line and causes the intercept to move up the positive half cycle of the reference voltage curve 31 for network 6 and triggers the network to conduct during the negative half cycle of the applied voltage curve 30 and thereby supply energy to the power source with a resulting regenerating or braking action.

The system thus automatically selects and energizes the proper bridge network 6 or 7 for motoring or regenerating mode of operation in response to the incoming command signal and the closed loop armature voltage feedback signal into the error amplifier 19. The firing in the absence of an error signal and a counter-electromotive force signal is at the zero crossover point of the anode reference voltage waveform as shown in FIG. 3. If a positive counter-electromotive force is present, the counter-electromotive force signal is super-imposed upon the reference and defines the new zero intercept point or line 34 and establishes a corresponding zero current firing point. When fired at this point, the output of the SCR network will be zero. In order to obtain a load current from the bridge network 6, the gate firing must be advanced in time ahead of the zero current firing point. The degree of advance for load current is controlled by the error signal which is superimposed upon the D.C. bias level and the counter emf level to establish the control intercept line 36. If the error signal is sufficiently great there is no intercept output and the logic to the "Nor" module 46 is held at a "0" level. As a result of the zero detector module 40, the digital gating regulator generates a pulse at each maximum of the reference voltage 31 and applied a trigger pulse to the gating network to fire the network at a 60° angle of the applied anode voltage wave corresponding to the maximum possible voltage of the applied voltage because the several phases of a three phase system intercept at the 60° point for any given phase voltage. The maximum voltage applied to the armature provides maximum current and torque; for example, during starting when the error signal is a maximum. As the motor begins to operate, the counter-electromotive force increases and the related signal fed through the control circuit. Also, the armature voltage signal which is fed back via the feedback line 12 to the error operational amplifier 19 is reduced. The counter-electromotive force is applied to the summing operational amplifier and the output of the summing operational amplifier will then be equal to the summation of the error signal and the counter-electromotive force.

Generally, until the armature counter-electromotive force equals the desired operating level, maximum allowable firing of the SCR's is maintained. Thereafter, the firing is established to essentially maintain the zero crossover point with respect to the desired counter-electromotive force. The regulating digital gating regulator 9 may automatically control the armature voltage to within plus or minus 2 percent while delivering any current within the rating of the motor regardless of line voltage or ambient temperatures.

The forward network 6 and may be assumed to establish clockwise torque while the network 7 is associated with the provision of a counterclockwise torque. Thus, if the input command signal is positive, clockwise torque is maintained to provide motoring torque. If, however, the load should overrun the desired operating point determined by the command signal and result in an overrunning torque on armature 4, the motor functions as a generator and the unit automatically provides regenerative braking torque. The negative signal added to the D.C. bias shifts the firing point to the negative half cycle of the network. The network 6 is thereby fired to conduct in a direction to permit transfer of the energy from the motor 1 to the supply line 8. The motor 1 is then operating in a regenerating or braking mode.

The illustrated embodiment of the invention provides a direct voltage system to particularly control the armature voltage under all operating conditions. If desired, with proper modification and provision of external current components, a similar speed control can be provided. The present invention, in a most novel aspect, resides in the use of the operational amplifier to provide an error signal in combination with the summing amplifier to modify the error signal in accordance with the armature counter-electromotive force and thereby providing an analog signal which properly controls a digital gating regulator to fire either of a pair of gated networks to control all possible anodes of operating a dynamoelectric machine.

Figure 4:
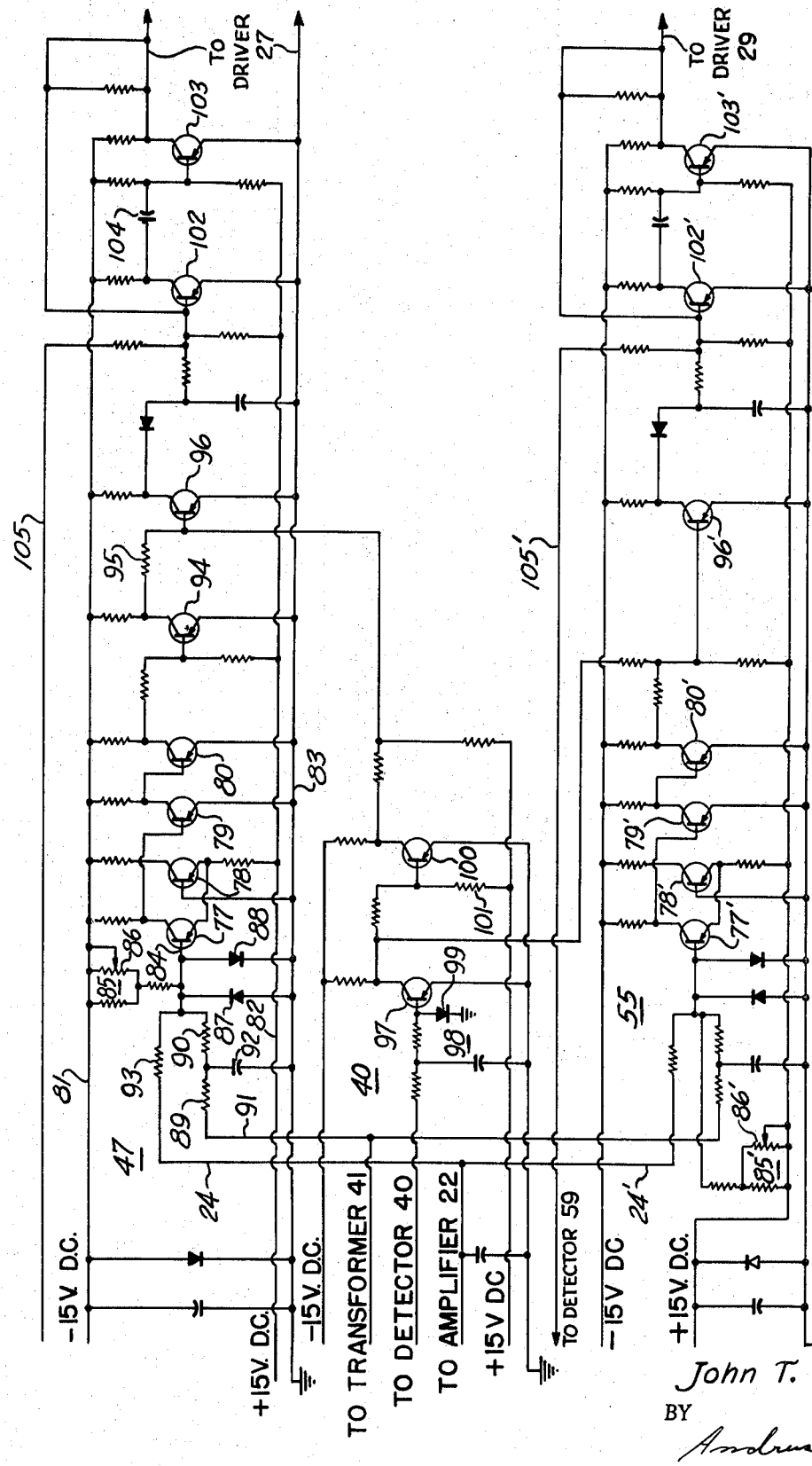
FIG. 4 is a schematic circuit diagram of selected components shown in FIG. 1 in block diagram.

The digital gating regulator and associated circuitry is more fully disclosed in a practical construction in FIG. 4 for driving a full wave bridge power circuit shown in FIG. 5.

Referring particularly to FIG. 5, the bridge networks 6 and 7 are shown employing well-known silicon controlled rectifier devices with six silicon controlled rectifiers 60 through 65 in bridge network 7 and 66 through 71 inclusive in bridge network 6. The silicon controlled rectifiers 60–71 are properly connected in pairs between the output lines 72 and 73 connected to the armature 4 with the junction of each pair of rectifiers interconnected to a related phase line 14. Each of the networks 6 and 7 provides a full wave three phase rectified output of the output lines with the bridge networks 6 and 7 connected in parallel. Each of the control rectifiers is similarly constructed with the anode 74 and cathode 75 properly connected between a phase line 14 and an output line 72 or 73. The gate 76 of each silicon controlled rectifier for conducting phase to phase voltages are interconnected to the gate drivers 27 and 29 for proper firing of silicon controlled rectifier pairs for sequential conduction of the three phase input. As the gate driver may take any desired configuration or design, a particular circuit is not shown in the illustrated embodiment of the invention. A preferred pulsing circuit is shown in applicant's copending application, Ser. No. 682,185, now U.S. Pat. No. 3,535,610, entitled GATING SYSTEM FOR CONTROLLED RECTIFIER MEANS, which is assigned to a common assignee and which was filed on Nov. 13, 1967.

In any structure, the output of the regulator 9 will provide pulse signals to fire the appropriate silicon controlled rectifiers in response to the summated error and feedback signals.

The intercept detector module 47 is a multiple stage high gain differential amplifier and particularly includes four cascaded transistors 77, 78, 79 and 80. The illustrated transistors 77–80 are of the PNP variety and are connected to suitable positive and negative D.C. power supply lines 81 and 82 as well as a ground or reference line 83 through suitable biasing resistors and the like. The differential configuration holds the base 84 of transistor 77 near ground in the absence of a selected summated input signal. The input transistor 77 has its base 83 connected to the negative supply line 81 through a resistive network 85 including an adjustable resistor 86. The resistive network 85 establishes the proper D.C. bias which in accordance with an actual embodiment of the invention equaled one half the peak value of the alternating current input. Clamping diodes 87 and 88 are connected back-to-back parallel relation between the base 84 and a ground or reference line 83 to prevent excessive saturation of the amplifier. A pair of resistors 89 and 90 are connected in series with each other to the base 84 and to an alternating current reference signal line 91. A capacitor 92 is connected between the junction of the resistors and ground line 83 and with resistors establishes a 30° lag filter to shift the signal at line 91 and establish a signal corresponding to curve 31 in FIG. 3. A lag filter is required because of the convenient construction of transformer 41 which provided a signal input at resistor 89 leading the anode reference voltage by 60° and which therefore had to be decreased by thirty degrees to establish the desired voltage wave 31 to transistor 77.

A resistor 93 is connected to the output of the summing amplifier 22 via the line 24 and constitutes a third input to the transistor 77.

The various input resistors are selected to convert the signal voltages into related individual currents such that the current at the base is the sum of the individual currents flowing through the three resistive paths. As the gain of the transistors 77–80 is substantial, a very small summated current at the base results in driving of the output transistor 80 into saturation thereby driving its collector or output terminal to ground, corresponding to the "0" level shown at 48 in FIG. 3.

The amplifying stages of the module 47 provide a high impedance, low hysteresis detector responsive to the summing current input. Thus, if the sum of the currents is sufficient to bias the transistor 77 on, the transistor 80 provides an output essentially ground potential. This corresponds to a logic zero level. If the transistor 77 is cut off, the output rises to a logic "1" level or a negative 10 volts in a practical circuit.

The output of the intercept detection module is connected to the inverter 49 which in FIG. 4 is shown as a common emitter connected transistor 94 of a PNP variety suitably interconnected to the D.C. supply and having its base connected to the output of the transistor 80. When the transistor 80 conducts to hold its output at essentially ground, the converter transistor 94 is cut off and conversely when the transistor 80 is cut off the transistor 94 conducts. This reverses the logic at the output of the transistor 94 with respect to the summated signal inputs to transistor 77.

A resistor 95 interconnects the output of the transistor 94 to a transistor 96 which constitutes the two input "Nor" circuit or module 46 in FIG. 1. The second input to transistor 96 is from the zero detector module 40.

The zero detector module 40 shown in FIG. 4 includes an input transistor 97 having an input circuit connected to the alternating current reference source through a resistive-capacitive filter network 98. This tends to reduce the sensitivity to noise and transients while adding only a minimal degree of phase lag into the circuit. A limiting diode 99 is also connected to the input circuit.

A transistor 100 constitutes the inverter logic device 44 of FIG. 1 and is connected to the output of the transistor 97. The transistor 100 is connected to the bias supply through a suitable temperature stabilizing resistive network including a resistor 101 connected between the base and positive bias potential to hold the transistor off under high temperature conditions and with a zero logic input.

In operation, when the A.C. reference input goes negative by about a minus 1 volt, an appreciable base current flows to turn on the transistor 97 and establishing the collector at reference or ground level thereby producing a "0" output. Conversely, when the input voltage is slightly above the minus 1, the transistor is cut off and the output is at a relatively negative level corresponding to logic "1" level. The logic inverter transistor 100 which inverts the logic and provides a logic "0" signal only during the negative half cycle and a logic "1" signal during the positive cycle of the reference voltage. The logic signals are applied as the second input to the "Nor" transistor 96. If either or both inputs are at a logic one level corresponding to a negative voltage, then the output of the transistor 96 is at ground and a logic "0". However, when and only when both inputs are at a logic "0" level, the output of the "Nor" transistor 96 becomes negative corresponding to the logic "1" signal. The "Nor" transistor 96 is normally at a logic "0" and can rise to a logic "1" level only during the positive half cycle of the reference input. The precise point at which it so raises being controlled by the signal from the intercept response transistor 80.

The output of the "Nor" transistor 96 is interconnected to control a related monostable logic circuit which in the illustrated embodiment is shown consisting of a pair of transistors 102 and 103 interconnected in a known circuit with transistor 102 cut off and transistor 103 conducting. In operation, when the output of the "Nor" transistor 96 changes from the ground or "0" logic to a negative or logic "1" level, the transistor 102 is biased on and grounds a capacitor 104 which turns off the normally conducting transistor 103 resulting in a negative level at the output of the transistor 103 and establishes a logic "1" output from the monostable circuit for a selected period. The bias network of the monostable circuit includes suitable bias resistors to insure that transistor 102 is held off in the absence of a proper input signal from transistor 96 even under leakage conditions such as high temperature and further includes a suitable filtering capacitor and clamping diode to enhance and improve the operation of the circuit.

In addition, a disable line 105 is interconnected to the input transistor 102 of the monostable circuit. The disabled line 105 is connected to the polarity detector 58 to permit actuation of the monostable circuit or module 57 only when circuit conditions are such that the related bridge network 6 is to conduct; i.e., when there is a positive error voltage signal. The polarity detector 58 in the illustrated embodiment of the invention may be any suitable circuit which normally applies a positive voltage to the transistor 102 of sufficient magnitude to hold the circuit in the normal state regardless of the output of the "Nor" transistor 96. In order to permit an output pulse, the signal at the disabled line 105 must drop to a logic "0" level. This in turn is connected directly by the polarity detector.

The input signal from the summing amplifier 22 is also connected to the intercept module 55 for the alternate bridge network 7. The intercept module 55 and related output modules for the bridge network 7 is essentially identical to that of the module 47 and corresponding transistor and circuit element have been identified by corresponding primed number. The output of transistor 80' is connected directly to a "Nor" circuit transistor 96' which is also interconnected directly to the output of the common zero detector transistor 97. The output of the "Nor" circuit transistor 96' is interconnected to control a similar transistorized monostable circuit of transistors 102' and 103' to control the gate driver 29 for the alternate bridge network 7. The output pulses 53 shown in FIG. 3 would thus be shifted 180° and be established when curves 43 and 48 are both at logic "1" levels. The disable line 105' connects transistor 102' to the negative polarity detector 59 to enable network 7 only during the negative half cycle of anode reference voltage. Thus, the intercept modules 47 and 55 in combination with the zero detector module 40 and the polarity detectors 58 and 59 provide an alternate control of the two bridge networks 6 and 7 to provide proper armature current to armature 4, depending upon the polarity of the error signal in combination with the magnitude of the summation of the error signal and the counter-electromotive force signal. This has been found to provide a very reliable and linear control of the firing of the silicon controlled rectifiers and the operation of the circuit.

The output of the several gating regulator boards are interconnected to control the firing of the bridge networks which as shown in FIG. 5 are constructed generally in accordance with applicant's copending application entitled GATING SYSTEM FOR CONTROLLED RECTIFIER MEANS. Each network 6 and 7 includes six silicon controlled rectifiers 66–71 connected as three phase full wave bridge in accordance with the known construction. The gate to cathode circuit of each rectifier 66–71 is interconnected to the gating regulator outputs.

The illustrated input transformer 15 is shown in FIG. 4 as a wye to wye circuit connection. The wye to wye construction is preferred because of the lack of any significant phase shift in the secondary output and consequently phasing of the control transformer unit for proper gating is well defined. If a delta to wye configuration is employed, there is an inherent 30° phase shift in line to line voltages and consequently compensating circuitry must be provided. However, either system can be employed.

The circuit 16 is a compensation and voltage transients suppression circuit associated with the full wave rectifier circuit. Generally circuit 16 includes a connected circuitry including selenium thyrector diodes 106 in parallel with a series connected resistance 107 and capacitor 108 in each phase of the three phase transformer secondary. Further, inductors 17 connected one in each of the A.C. lines to the respective bridge inputs limits the $di/dt$ effect during commutation intervals. These have been found particularly necessary in view of the use of the thyrector diodes which have a substantial amount of inherent capacitance. Inductance is not required in the D.C. circuit as the armature inductance will always be sufficient to limit the $di/dt$ effect during the commutation or rectifier turn off period.

In the illustrated embodiment of the invention, the armature related signal current is derived from three current transformers 109 each of which includes a primary winding 110 connected in series in each of the phase lines and a secondary winding 111 providing a signal proportional to the phase current. A protective resistor 112 may be connected in parallel with each secondary winding as illustrated. Each of the current transformers is similarly constructed and connected in the circuit and consequently a single unit is described; it being readily understood that the other lines are similarly connected.

The secondary winding 111 is connected as the input to a full wave wheatstone bridge type diode rectifier 113, the output of which is connected across a pair of series connected potentiometers 114 and 115. The three rectifiers 113 are connected in parallel to the three phase currents. The common junction of the series connected potentiometers 114 and 115 are connected to a common reference 116 and each includes a tap 117 and 118 respectively also interconnected to the common reference line. The one or upper potentiometer 114 establishes the level of the positive armature current signal while the lower potentiometer 115 similarly establishes the level of the negative armature current signal with respect to the common reference line 116.

The signals at lines 119 and 120 are the same regardless of the direction of the armature current and consequently whether the positive armature signal or the identified negative armature current signal is inserted in the circuit is separated and independently determined. In the illustrated embodiment of the present invention, the output of the polarity detector units 58 and 59 are connected to control a pair of gate units 121 and 122 which respectively connect the potentiometer output lines 119 and 120 to the summing amplifier 22. If a positive armature current signal is desired, the gate 121 is enabled to transfer the signal while the negative gate unit 122 will be held in an off condition. Any suitable gating system can be employed, the details thereof are not set forth. The polarity detector control is satisfactory because the negative armature current is always associated with the operation of the bridge network 6 and the positive armature current is always associated with the bridge network 7.

The voltage signal is derived directly across the armature 4 by a pair of series connected resistors 123 and 124 connected across the armature. The voltage signal appearing across the resistor 123 is fed, preferably through the isolating and filtering network 20, directly to the summing amplifier 22. The armature voltage inherently provides the necessary polarity. The isolating and filtering networks for both armature and voltage signals may be of a well-known variety such as a magnetic amplifier unit with proper resistive capacitive filtering elements.

Although the details shown in the drawing of the input circuit and the like full wave bridge rectifiers and the like are not essential, the illustrated circuit has been found to provide a highly satisfactory and commercially practical motor control circuit establishing accurate control of armature current to within plus and minus 2 percent while delivering any current within the rating of the constant field voltage motor regardless of line voltage or ambient temperature within given specifications.

Various modes of carrying out the invention are contemplated as being within the scope of the following claims, particularly pointing out and distinctly claiming the subject matter which is regarded as the invention.

I claim:

1. A motor control circuit for energizing of a motor having an armature to maintain a regulated motor output, comprising command means to establish a command voltage signal proportional to a desired motor output signal forming means having means coupled to the motor to establish a first signal related to the actual motor output and the desired output to define an error signal and current sensing means to establish a second signal proportional to armature current, control means for controlling the input power connection of said motor to an incoming power supply, and actuating means for said control means connected to said signal forming means and having a first input means connected to receive said first signal and a second input connected to receive said second signal to produce a net signal equal to the sum of the error signal and the signal proportional to the counterelectromotive force and connected to said control means and actuating said control means in accordance with the summation of said first and second signals, said second signal being of a polarity corresponding to the armature voltage for establishing essentially zero power input to said motor with said actual motor output corresponding to said desired output and providing a continuous positive tracking of the counterelectromotive force of the armature.

2. In a motor control circuit for controlling the energization of a motor having an armature with an armature current varying with the motor load in accordance with a feedback signal, comprising means to supply current to the armature, a first feedback signal means providing a signal proportional to the actual motor output, a command signal unit, a first comparing means having a pair of input means connected to the first feedback signal means and to the command signal unit and establishing an error signal output proportional to the algebraic summation thereof, a second feedback signal means providing a corresponding current signal proportional to the motor armature current for all modes of motor operation and the related resistance armature voltage drop of the motor and a voltage signal proportional to the motor armature voltage, and a second comparing means having input means connected to said first comparing means and to the second feedback signal means and providing a summated error signal equal to the difference of the current signal and the voltage signal algebraically added to the error signal with the current signal polarity corresponding to the polarity of the first feedback signal means and connected to the means to supply current for controlling the current supply to the armature of said motor within the rating of the motor.

3. In a motor control circuit for controlling the energization of a motor having an armature with an armature current varying with the motor load in accordance with a feedback signal, comprising
   a voltage source for energizing of said armature,
   a first voltage feedback signal means providing an armature voltage signal proportional to the armature voltage,
   a command signal unit establishing a voltage proportional to a desired armature voltage,
   a first comparing means having a pair of input means connected to the first voltage feedback signal means and to the command signal unit and establishing an error signal output proportional to the algebraic summation thereof,
   a second feedback signal means providing a corresponding current signal proportional to the motor armature current for all modes of motor operation and the related resistance armature voltage drop of the motor and establish an IR drop voltage signal proportional to the motor armature voltage drop, and
   a second comparing means having input means connected to the first and second feedback signal means and with the IR drop voltage signal subtracted from the armature voltage signal to provide a tracking signal proportional to the counterelectromotive force and connected to said first comparing means to add the error signal to the tracking signal and provide a summated error signal to the voltage source for continuously controlling the current supply to the armature of said motor within the rating of the motor.

4. The motor control circuit of claim 3 for controlling a reversible motor, having a pair of parallel connected gated rectifying networks connected to energize said motor, said second comparing means connected to said rectifying networks and said summated error signal controlling gating of said networks, said first comparing means establishing a direct current error signal output related to the relative polarities of the input and proportional to the algebraic summation thereof, and
   a selection means connected to first comparing means and said rectifying networks to enable one network in response to a given polarity of the error signal and the other network in response to an opposite polarity of the error signal.

5. The motor control circuit of claim 3 having an alternating current input means and a pair of gated networks connecting said alternating current input means to said motor, and a gating regulator connected to said second comparing means and to said gated networks and establishing a phased gating of said networks during each half cycle of the alternating current in accordance with said summated error signal.

6. The motor control circuit of claim 3 for controlling the power supplied to the armature of a direct current motor, having an alternating current input means and a pair of parallel rectifying gated networks connected in parallel to said input means and said motor armature and a gating regulator connected to said second comparing means and to both of said gated networks to simultaneously generate phase gate signals during each half cycle of the alternating current, and selection means responsive to said first named error signal and connected to said regulator to operatively inhibit one of said gate signals.

7. The motor control circuit of claim 3 having a polyphase alternating current input means, and a pair of gated networks each including a plurality of gate controlled rectifiers connected in phase related pairs, said networks being connected in parallel and polarized to conduct opposite load currents and connected between said input means and said motor, a gating regulator connected to said second comparing means and having a plurality of output means connected to said paired controlled rectifiers to control the firing thereof during each corresponding half cycle of the applied alternating current, said first comparing means establishing a direct current error signal output related to the relative polarities of the input and proportional to the algebraic summation thereof, and
   a selection means connected to first comparing means and said rectifying networks to enable one network in response to a given polarity of the error signal and the other network in response to an opposite polarity of the error signal.

8. The motor control circuit of claim 3 having an alternating current input means and a pair of gated unidirectional conductive networks connecting said input means to said motor, and a solid state logic circuit having an alternating current input phase related to the alternating current input to said gated network and having means to establish a series of time spaced pulses for gating said gated network at a given time in each half cycle, and circuit means connected to said logic circuit and to said second means to vary said given time and establish a zero current network output under all motor operation wherein said error signal is zero.

9. The motor control circuit of claim 3 having an alternating current input means, a pair of gated rectifier networks connecting said input means to said motor, and a solid state logic circuit having an alternating current input phase related to the alternating current input to said gated rectifier networks and having a pair of pulse generating channels including a common input to said second comparing means and each establishing a series of time spaced pulse trains for gating a corresponding network at a given time in each half cycle, and having corresponding pulses in said trains being spaced by 180° with respect to said input means, and circuit means connected to said logic circuit and to said second means to vary said given time and establish a zero network current under all motor operation wherein said error signal is zero.

10. The motor control circuit of claim 3 having an alternating current input means and a pair of gated networks connecting said input means to said motor, and a solid state logic circuit having an alternating current input phase related to the alternating current input to said gated networks and having means to establish a series of time spaced pulses for gating said networks in at a given time in each half cycle, and circuit means connected to said logic circuit and to said second means to vary said given time and establish a zero current under all motor operation wherein said error signal is zero.

11. The motor control circuit of claim 3 having an alternating current input means and a gated rectifying network connecting said input means to said motor, and a gating regulator having a binary logic output whereby a pulse is generated by successive timed changes in the output between two magnitudes, said gating regulator having a reference alternating current input having zero crossover points phase shifted 30° to lead the alternating current input to the gated network and constructed to generate a first edge of a pulse at each zero crossover point, a reference alternating current phase shifted to lag said alternating current input to said network by 60° and connected in said gating regulator to form the second edge of said pulse and to limit the firing during each half cycle to a given maximum output point, and a direct current bias signal source adapted to be connected to said gating regulator to establish an effective zero crossover point in phase with the zero crossover point of the alternating current input to the gated network in the absence of a summated error signal, and circuit means to connect the bias signal source and said second means to said gating regulator to establish a signal intercept with said reference alternating current input and thereby establish said first edge of the pulse in accordance with said bias signal and said summated signal.

12. The motor control circuit of claim 3 having a polyphase alternating current input means, a pair of similar gated rectifier networks connected in parallel to said input means and to said motor, and each having a pair of gated devices for each phase of said input means, and a gating regulator having a binary logic output channel for controlling a pair of gated devices for one phase of each network, each channel of said gating regulator having a zero detector and a first intercept detector for one network and a second intercept detector for the second network, a first reference alternating current input connected to said intercept detector and having zero crossover points phase shifted 30° to lead the alternating current input to the related pair of gated devices of said networks and constructed to generate a change in the logic level of the intercept detectors at each zero crossover point, a second reference alternating current phase shifted to lag said alternating current input to said network by 60° and connected to said zero detector to change the logic level to the zero detector at each zero crossover point, to limit the firing during each half cycle to a given maximum output point, and a direct current bias source connected to said intercept detectors to establish an effective zero crossover point in phase with the zero crossover point of the alternating current input to the gated network in the absence of a summated error, and circuit means to connect said second comparing means to said intercept detectors to establish a signal intercept with said reference alternating current input and thereby establish said change in logic level in accordance with said bias signal and said summated signal, first pulse means to control the first network and connected to said first intercept detector and said zero detector to establish a pulse signal during the positive half cycle of the second reference signal, second pulse means to control the second network and connected to said second intercept detector and said zero detector to establish a pulse signal during the negative half cycle of the second reference signal.

13. The motor control circuit of claim 12, having a gate means connecting said first pulse means to said first network and a second gate connecting said second pulse means to said second network, said first comparing means establishing a direct current output having a polarity related to the relative polarities and magnitudes of the inputs thereto, a polarity detection means connected to the output of the first comparing means and to said gate means to selectively enable one of said gate means in response to a first polarity and the other in response to the second polarity.

14. The motor control circuit of claim 12, wherein said intercept detectors include a load detector amplifier having an input means, said first reference alternating current being applied to said input means and biasing said amplifier to a first signal logic level during the positive half cycle and a second signal logic level during the negative half cycle, said direct current bias source being connected to said input means and biasing said amplifier to increase the period of one of said signal levels and decrease the period of the other of said signal levels, and said second comparing means being connected to said input means to vary the direct current bias to said input and thereby vary the intercept with said first reference alternating current to control the phase at which said signal logic level changes.

15. In a motor control circuit for a motor having an armature connected in an armature circuit to an alternating current supply, command means to establish a command voltage signal proportional to a desired motor operation, first voltage feedback means to establish a feedback signal proportional to the armature voltage, first summating means connected to said command means and to said feedback means to provide an error voltage signal, second feedback means having a first current sensing unit coupled to the armature circuit to establish a corresponding feedback signal for all modes of motor operation proportional to the armature current voltage drop of the motor armature and a voltage signal proportional to the armature voltage, a second summating means connected to said first summating means and to said second feedback means to provide a summated control signal proportional to the algebraic sum of said signal and including the difference of said armature voltage and said armature current voltage drop added to said error signal to establish continuous tracking of the counterelectromotive voltage of such armature, gated means connected in said armature circuit and having an alternating current input and a periodic output, and means connecting the gated means to said second summating means and having an alternating current reference voltage signal and gating said gating means to conduct in accordance with the control signal intercept with said voltage signal to control the motor for all modes of motor operation.

16. The motor control circuit of claim 15, wherein said gated means includes a pair of full wave bridge networks employing a silicon controlled rectifier in each leg of the network, said networks being connected parallel to the motor and to supply voltage means and a first gated means being connected to conduct a forward torque armature current and the second gated means being connected to conduct a reverse torque armature current, said last named means including an intercept detector for a pair of related rectifiers in each network and a common zero current detector for each pair of intercept detectors, each of said intercept detectors being connected to an alternating current reference voltage in selected phase relationship to the anode reference voltage from said supply voltage means and to a direct current bias means selected in accordance with said selected phase relationship, the output means of said summing amplifier establishing a direct current signal and being connected in common to said intercept detector, said common zero current detector including an amplifying device and being connected to an alternating current reference voltage in selected phase relationship to said anode reference supply voltage, logic circuit means for each of said controlled rectifiers and having a first input means connected to a corresponding intercept detector and a second input means connected to a corresponding zero current detector and producing an output signal in response to preselected related inputs, pulse forming means connected one each to each of said logic circuit means and to the corresponding pair of rectifiers to establish simultaneous firing of the pair of rectifiers, said error amplifier providing a given polarity error signal for forward torque and a reverse polarity error signal for reverse torque, and polarity sensing means connected to the error amplifier and to said pulse forming means to selectively bias the networks such that only one network is enabled in response to one polarity of error signal and the second network is enabled in response to the opposite polarity of error signal.

* * * * *